(12) United States Patent
Wu et al.

(10) Patent No.: US 7,051,232 B2
(45) Date of Patent: May 23, 2006

(54) METHOD FOR MANAGING DEFECTS OF OPTICAL DISK

(75) Inventors: Tse-Hong Wu, Tai-Nan (TW); Yuan-Ting Wu, Hsin-Chu (TW); Ming-Hung Lee, Taipei Hsien (TW)

(73) Assignee: MediaTek Inc., Hsin-Chu (TW)

( * ) Notice: Subject to any disclaimer, the term of this patent is extended or adjusted under 35 U.S.C. 154(b) by 639 days.

(21) Appl. No.: 10/249,220

(22) Filed: Mar. 24, 2003

(65) Prior Publication Data

US 2004/0078640 A1    Apr. 22, 2004

(30) Foreign Application Priority Data

Sep. 13, 2002    (TW) .............................. 91121070 A

(51) Int. Cl.
*G06F 11/16* (2006.01)

(52) U.S. Cl. .................. 714/8; 714/5; 714/6; 714/7; 714/9; 369/47.14

(58) Field of Classification Search .................. 714/5, 714/6, 7, 8, 9; 369/47.14
See application file for complete search history.

(56) References Cited

U.S. PATENT DOCUMENTS

| 5,418,767 A | * | 5/1995 | Gaudet et al. ............ 369/53.16 |
| 6,233,699 B1 | * | 5/2001 | Sasaki et al. .................. 714/7 |
| 6,453,384 B1 | * | 9/2002 | Park et al. ..................... 714/7 |
| 6,469,978 B1 | * | 10/2002 | Ohata et al. ............. 369/275.3 |
| 6,483,790 B1 | * | 11/2002 | Nakane et al. .......... 369/47.14 |
| 6,496,455 B1 | * | 12/2002 | Takagi et al. ............ 369/47.14 |
| 6,615,363 B1 | * | 9/2003 | Fukasawa ...................... 714/5 |
| 6,631,106 B1 | * | 10/2003 | Numata et al. .......... 369/47.14 |
| 6,725,395 B1 | * | 4/2004 | Ono et al. ..................... 714/8 |
| 6,728,899 B1 | * | 4/2004 | Ng et al. ........................ 714/8 |
| 6,940,796 B1 | * | 9/2005 | Ariyama ........................ 714/8 |

* cited by examiner

Primary Examiner—Robert Beausoliel
Assistant Examiner—Joseph D. Manoskey
(74) Attorney, Agent, or Firm—Winston Hsu

(57) ABSTRACT

A method for accessing data on an optical disk by a drive. The optical disk includes spare packets and data blocks. Each data block is for recording data written to the optical disk, and each spare packet has spare blocks for replacing defect blocks to record data. The drive has a memory allocated with buffers, and each buffer is for recording data of a spare packet. When writing data of a first buffer to a packet of the optical disk, if a plurality of first spare blocks are found defective, then searching a second spare packet which has spare blocks for replacing the first blocks. If the second spare packet is not read in a buffer, reading the second spare packet into a releasable buffer. After copying data written to the first spare blocks from the first buffer to the second buffer, making the first buffer releasable.

12 Claims, 26 Drawing Sheets

METHOD FOR MANAGING DEFECTS OF OPTICAL DISK

BACKGROUND OF INVENTION

1. Field of the Invention

The present invention relates to a method to manage defects of an optical disk. More specifically, a method sets up a plurality of buffers in memory of an optical drive to improve memory use efficiency and defect regulation during optical disk defect management.

2. Description of the Prior Art

Optical disks, due to their small volume and large storage capacity, have become one of the most common volatile data storage media used in modern society. More specifically, development of rewritable optical disks being capable of recording personal data according to a user has largely expanded the flexibility of the use of optical disk. However, defects occur when data is written onto an optical disk. Managing defective areas on an optical disk to maintain the function of recording data concisely has become a focus of the industry.

A drive is required to accesses data in a corresponding optical disk. Please refer to FIG. 1. Illustrated in FIG. 1 is a block diagram regarding a conventional drive 10 accessing an optical disk 22. The drive 10 comprises a motor 12, a pickup head 16, a controller 18, and a memory 20. A user can control the drive 10 by accessing the host 26.

When the optical disk 22 is set on a housing 14, the motor 12 will rotate the optical disk 22, and the pickup head 16 can access data on the optical disk 22 through an exciting laser beam.

The controller 18, a control chip, is applied to control the drive 10. The memory 20, a volatile random access memory, is used to temporarily store data during operations of the controller 18. The host 26 can be a computer system being capable of accessing data on the optical disk 22 by commanding the controller 18. Data on the optical disk 22 will be written on a track 24. When the motor 12 drives the optical disk 22 to rotate and make the track 24 skip on the pickup head 16, the controller 18 can analyze the data recorded on the optical disk 22, buffering the data in the memory 20 temporarily, and deliver the data to the host 26.

In order to record data on the optical disk 22, the host 26 transfers data to the drive 10 to buffer the data temporarily in the memory 20. Then the controller 18 can according to the data temporarily stored in the memory 20 control the pickup head 16 to write the data onto the track 24.

Defects may be caused by many reasons when data is written onto an optical disk such that data will not be able to be written to defective blocks correctly. In order to maintain data recording function of an optical disk, a systematic method must be applied to manage defects. For example, spare blocks can be predefined on a track of an optical disk. When defects occur on the optical disk, data can be recorded on these spare blocks in replace. Please refer to FIG. 1 and FIG. 2. FIG. 2 is a schematic diagram according to an embodiment of defining spare blocks on the track 24 on the optical disk 22. In general, a Lead-In Area, LI, and a Lead-Out Area, LO, are provided in the head and the tail of the track 24 respectively. Between the two areas, a program area, program area PA, is provided to record data. As mentioned above, in order to prevent data from being lost on the track 24 because of the defects, the program area PA, can be divided into one or several spare area packets, SA (a plurality of spare area packets are labeled as SA (1), SA (2) . . . SA (n) on FIG. 2). In order to write data to the optical disk 22, the space left in the program area, PA, can be divided to one or several data area packets, DA (A plurality of data area packets are labeled as DA (1), DA(2) . . . DA(n) on FIG. 2). In order to more easily manage data accessing, each data area packet DA, and each spare area packet, SA, can be further divided into a plurality of data packets, Pd, and spare packets, Ps, wherein a data block Bd, is the basic data-recording unit in a data packet Pd, and a spare data block, spare data block Bs, is the basic data-recording unit in a spare packet Ps. For example, each data block Bd, and each spare data block Bs, can be an area being capable of recording one or several kilobytes on the track 24. A number of spare data blocks Bs, or spare packets Ps, can be accumulated to make up a spare packet Ps, and a spare area packet SA, respectively. Similarly, as illustrated in FIG. 2, a data block Bd, a data packet Pd, and a data area packet DA, are organized in the same way. During operation, each data block Bd, and spare data block Bs, on the track 24 can be assigned with different address such as physical block number, according to their arrangement order. For convenience, a spare data block Bs, can be provided to have identical data capacity of a data block Bd so that one defect data block Bd, can be replaced by one spare data block Bs. Therefore, a spare packet Ps, will have the same capacity to a data packet Pd.

When the optical disk 22 is rotated, the pickup head 16 will skip every part of the track 24, as an arrow A1 illustrated in FIG. 2. The principle of defect management of optical disks can be expressed as follows. If a user assigns data to be written on the optical disk 22, the data will be written to each data block Bd of each data area packet DA. If the drive 10 recognizes defects in a data block Bd so that data cannot be recorded concisely, the drive 10 can find one spare data block Bs in a spare area packet SA to replace the data block Bd having defects. Then data will be recorded to this replacing spare data block Bs. Certainly, the relationship of the data block Bd having defects and the replacing one should be recorded on the optical disk 22. As illustrated in FIG. 2, a Main Table Area, MTA, and a Secondary Table Area, STA, are further provided on the track 24 to record a defect table DT and its backup. The relationship between each defective data block Bd and its corresponding replacing spare data block Bs is recorded in the defect table DT. If there are a plenty of defective Bds on the optical disk 22, the defect table DT can record each relationship between each defective data block Bd and its corresponding replacing spare data block Bs. When accessing data on the optical disk 22, if defects occur in a data block Bd, the drive 10 can according to the relationship recorded in the defect table DT find out address of the replacing Bsand access data stored in the spare data block Bs. Applying this method, even if there are defect data blocks Bd, the drive 22 can still record data correctly. Except for a data block Bd, a spare data block Bsin each data area packet DA may also be defective and fail to record data. This defective spare data block Bs must be replaced by another normal spare data block Bs.

Please refer to FIG. 3. FIG. 3 is a schematic diagram of a prior art defects management method flow 100 when the drive 10 performs data recording. The flow 100 is as follows:

Step 102: If the drive 10 recognizes defective areas being unable to be applied to record data concisely, the step starts. The defective area can be a defective data block Bd or a defective spare data block Bs.

Step 104: According to the defective area, search for a replacing spare data block Bs and the spare area packet SA where the replacing spare data block Bs is located. If the defective area recognized in step 102 is a new defective area without a corresponding spare data block Bs and any record in the defect table DT, anewBs, which has not been used to replace any defective area, will be used to replace the defective area recognized in step 102. It is possible that one normal area on the rewritable optical disk still functions well when data is written onto the area at first, but then the area turns out to be fault when new data is written to that area again. Such area is a new detected defective area. Since the area functioned well at first, the defect table DT cannot recognize it as a defective one. Such "new detected defective area" can be called as an unregistered defective area, meaning that the defect table DT has not recorded it. When defects management is performed on that new detected defective area, the new detected defective area will be assigned with a corresponding spare area, and the defect table DT will record the relationship. The defective area then becomes a registered defective area. If the defective area recognized in step 102 is a registered defect area already, the defect table DT can find a corresponding spare area according to the record in this step.

Step 106: Transfer data in the spare area of spare area packet SA found in step 104 to the memory 20 of drive 10. Please refer to FIG. 1 at the same time. If each spare data block Bs and data block Bd are memory units having less memory, the drive 10 can more efficiently make use of memory space on the track 24. However, the cooperative operations of the drive 10 must work very precisely in order to transfer data to a smaller data block Bd or spare data block Bs. It may demand too much to fulfill. Thus, in practicing, the drive 10 always takes one program area PA or spare area packet SA as one unit to transfer data to the optical disk 22. For example, when data are already stored in three spare data blocks Bs in a spare area packet SA and the drive 10 has to transfer new data to the 4th spare data block Bs in the spare area packet SA, the drive 10 has to move the data stored in the previous 3 spare data blocks Bs to the memory 20, combine the previous data with the new 4th data as a unit, and transfer the combined unit back to that spare area packet SA. In other words, the previous data stored in the three spare data blocks Bs will be transferred repeatedly. In this step, the spare area packet SA has to be transferred to the memory 20 so that after the data is refreshed, the refreshed data collected from each spare data block Bs will be transferred to the optical disk 22 as a spare area packet SA unit.

Step 108: To the defective area mentioned in step 102, the corresponding spare data block Bs and its spare area packet SA have to be written to the memory 20. The data meant to be written to that defective area will be copied to a spare area packet SA of the memory 20 and acts as a unit. The refreshed data stored in the spare area packet SA will be rewritten to the track 24 on the optical disk 22.

Step 110: If other defective spare data blocks Bs are detected in the rewriting procedure of step 108, go back to step 102 and work on the detected defects of spare data block Bs. If it goes well in step 108 and finds no other defective spare data block Bs, the process can go on to step 112. Other unregistered defective spare data block Bs might be detected in step 108 when data is rewritten to a spare area packet SA. The procedure has to go back to step 102 to deal with the detected defective spare data block Bs.

Step 112: If the rewriting procedure goes well in step 108, the spare area packet SA applied for transferring data of the memory 20 in step 106 can be released. The occupied memory of the spare area packet SA can be released to buffer other data.

Step 114: Return to step 102 if other defect area has to be deal with. If not, go to step 116.

Step 116: End.

Please refer to FIG. 4A to FIG. 4C. Illustrated in FIG. 4A to FIG. 4C are schematic diagrams of associated data assignments on the track 24 of the optical drive 20 in the prior art flow 100. As illustrated in FIG. 4A, when the drive 10 transfers data to a data packet Pd1, the data will be buffered in the memory 20 and transferred to the data packet Pd1 through the pickup head 16(please refer to FIG. 1). In FIG. 4A, data in the memory 20 meant to be transferred to data block Bd1, Bd2, and Bd3 in the data packet Pd1 is marked by "( )". If the drive 10 detects the data block Bd2 as a defective block, the flow 100 will be initiated. As illustrated in FIG. 4B, if in step 104, it has been decided to replace the data block Bd2 with the spare data block Bs3 in the spare packet Ps1, data in the spare packet Ps1 will be transferred to the memory 20 in step 106. Similarly, in FIG. 4B, data in the memory 20 meant to be transferred to the spare packet Ps1 and the spare data blocks Bs1 and Bs2, is marked by "( )". In step 108, data meant to be transferred to the defective data block Bd2 will be copied to the spare packet Ps1 in the memory 20. Then, as illustrated in FIG. 4C, data in the spare packet Ps1 of the memory 20 will be refreshed and transferred to the track 24 in step 108. Data meant to be transferred to the defective data block Bd2 will be recorded in the spare data block Bs3. If the defective data block Bd2 is unregistered, the relationship of the data block Bd2 and the spare data block Bs3 must be recorded in the defect table DT. Ideally, defects management on the data block Bd2 performed in step 108 can be terminated if no other defective spare data block Bs is being detected. The memory space of the memory 20 occupied bathe spare packet Ps1 will be released in step 112.

According to the discussion above, the prior art flow 100 handles one defect at a time. A spare area packet SA buffered in the memory 20 can be released only if no further defects are detected in step 108. In an ideal condition, the prior art flow 100 will not occupy too much memory space in the memory 20 for spare area packet SA, which is meant for transferring to drive 10. However, in practice, a spare data block Bs in a spare area packet SA might be a defect. Basically, the possibility for a spare data block Bs to be defective is identical for a data block Bd to be defective. In this condition, the prior art flow 100 might unceasingly occupy the memory space in the memory 20 to buffer spare area packets SA in order to manage defects.

Please refer to FIG. 5A to FIG. 5E. Illustrated in FIG. 5A to FIG. 5E is a more realistic schematic diagram of data allocation arrangement between the track 24 and the memory 20 of the prior art flow 100. As illustrated in FIG. 5A, it assumes that the drive 10 detects two defective data blocks Bd2 and Bd3 in the data packet Pd1 when data buffered in the memory 20 are transferred to the data packet Pd1. For the prior art flow 100 can only performs defects management for one block at time, we assume here that the drive 10 performs defects management on the data block Bd2 at first, and in step 104, a spare area packet SA in the spare packet Ps1 is determined to replace the defective data block Bd2. In step 106, the drive 10 allocates a memory space in the memory 20 for the spare area packet SA to buffer data from the spare packet Ps1 to the memory 20. In step 108, the drive 10 will copy the data meant to be transferred to the data block Bd2 to a temporal spare packet Ps1 in the memory 20. As illustrated in FIG. 5B, in step 108, the temporal storage memory Ps1 in the memory 20 will be transferred back to the spare packet Ps1 on the track 24.

To be much closer to the real situation, we assume that the drive 10 detects another two defective spare data blocks Bs1 and Bs3 during the retransferring procedure in step 108. In order to apply defects management on these two spare data blocks Bs, the flow 100 will go from step 110 to step 102. Since the spare packet Ps1 buffered in the memory 20 still stores backup data of the spare data blocks Bs1 and Bs3, the spare packet Ps1 cannot be released from the memory 20. Because the flow 100 can only deals with one defective area at a time, in this case, we assume that the flow 100 performs its defects management on the spare data block Bs1 first. As illustrated in FIG. 5C, when the flow 100 goes from step 102 to step 104 again, in order to replace the defective spare data block Bs1 with the spare data block Bs4 in the spare packet Ps2, again the drive 10 has to allocate a spare area packet SA in the memory 20 in step 106. In step 108, as illustrated in FIG. 5D, data in the spare data block Bs1 will be transferred to the replacing spare data block Bs4. If two more defective spare data block BsS and Bs6 have been detected during the retransferring procedure, the flow 100 has to go back to step 102. At the same time, the spare packet Ps2 still occupies the memory 20 because the data of the spare data blocks Bs5 and Bs6 are unable to be released.

If the flow 100 decides to replace the defective spare data block Bs5 with a spare data block Bs7 in the spare packet Ps3, the stored data must be transferred to the memory 20 in step 106, and the original data stored in the spare data block Bs5 has to be copied to the spare packet Ps3 in the memory 20. In FIG. 5E, the refreshed spare packet Ps3 in the memory 20 will be written to the spare packet Ps3 in order to transfer data from the spare data block Bs5 to the spare data block Bs7. If another defect is detected in the spare packet Ps3, neither the spare packet Ps3 in the memory 20 nor a new memory space can be released. A further memory space for a spare area packet SA has to be allocated for a new spare area packet SA to be transferred by. Only if no further defects are detected when the spare packet Ps3 is rewritten can the spare packet Ps3 in the memory 20 be released. The flow 100 has to go back from step 114 to step 102 to perform defects management on the spare data blocks Bs6, Bs3, and other Bd3 associated defects management. As shown in FIG. 5A to FIG. 5E, due to that the flow 100 can only cope with one defect, spare area packets SA buffered in the memory 20 cannot be released. To deal with continuous incidents of defects detected in step 108, it costs too many resources of the memory 20. For example, from FIG. 5A to FIG. 5E, due to that the flow 100 can only deal with one defect at once, data in the spare data block Bs3 and Bs6 in the memory 20 cannot be released and occupies memory resources of the memory 20 unceasingly.

Therefore, the prior art flow 100 cannot make use of memory space of the memory 20 effectively and waste memory resources continuously. Defects management cannot be done effectively and operation efficiency of the drive 10 will deteriorate.

SUMMARY OF INVENTION

It is therefore a primary objective of the claimed invention to provide a defects management method and associated procedures to make use of memory resources effectively and solve the above-mentioned problem.

According to the claimed invention, a plurality of buffers is provided in a memory to store temporary packets. The claimed invention can perform defects management on a plurality of defects at the same time so as to release packets of the buffers as soon as possible. During defects management, it takes only a releasable buffer among a plurality of buffers for performing defects management with a fixed number of buffers. For example, if a defect occurs in another spare packet Ps when a spare packet Ps temporarily stored in buffer A is rewritten to an optical disk, the corresponding substitute to the defective spare packet Ps can be released to a buffer B and copy the corresponding data in the buffer A to the spare packet Ps in the buffer B wherein data in the buffer A will be released and the buffer A can become a released buffer. Thus there will still be a releasable buffer left in memory. If other new defective spare data block Bs is detected while a spare packet Ps in a buffer is rewritten, the released buffer A can be used to temporarily store the spare packet Ps for performing defects management. Even if other defective spare data block Bs is detected during rewriting procedure of the spare packet Ps in the buffer B, a fixed number of buffers can satisfy the memory demand on performing defects management. This makes defects management more efficiently and keeps optical drives operating normally. During defects management, each spare packet Ps in a buffer can be used as a cache so that the number of times to write spare packet Ps will be reduced, data access efficacy of the optical drive will be improved, and life span of the optical disk will be prolonged.

These and other objectives of the claimed invention will no doubt become obvious to those of ordinary skill in the art after reading the following detailed description of the preferred embodiment, which is illustrated in the various Figures and drawings.

DETAILED DESCRIPTION

Figure 1:
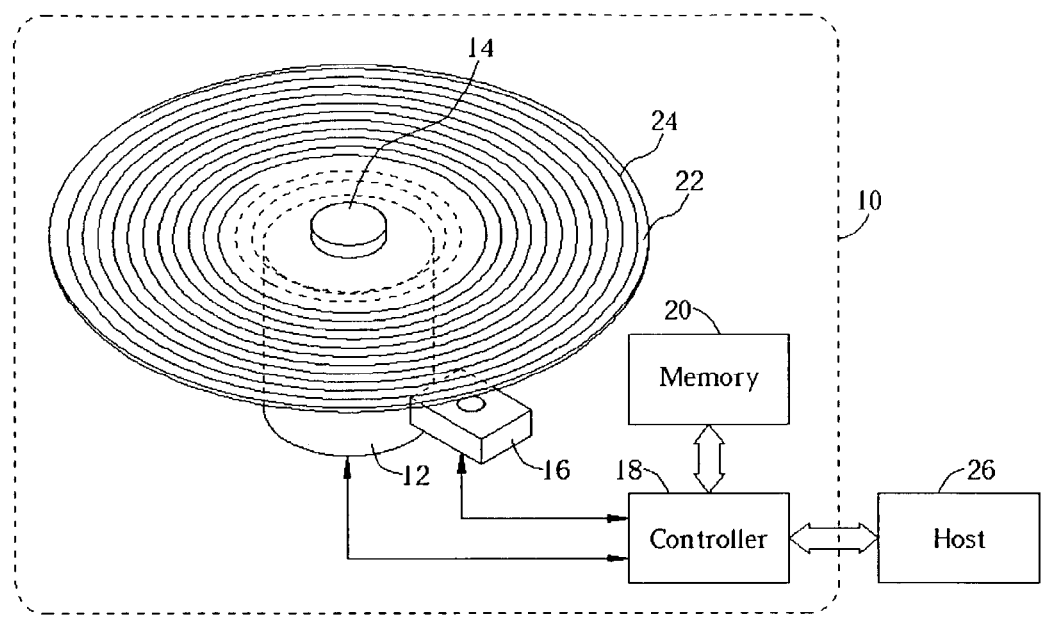
FIG. 1 is a block diagram of a conventional optical drive.
Figure 2:
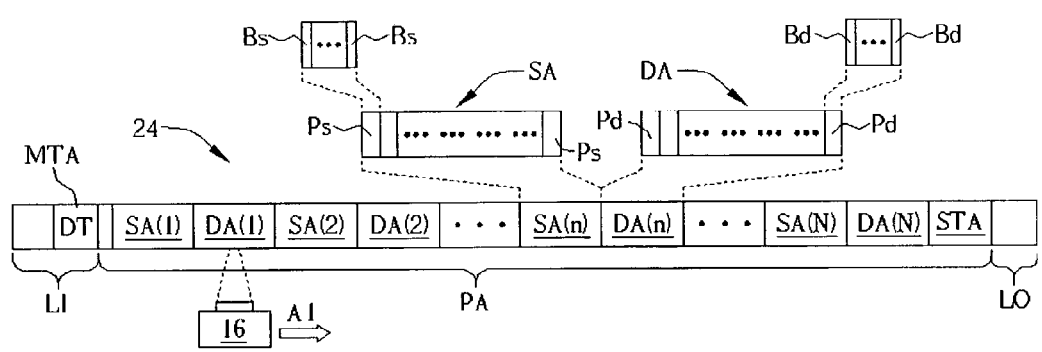
FIG. 2 is a schematic diagram of data allocation on the conventional optical disk illustrated in FIG. 1.
Figure 6:
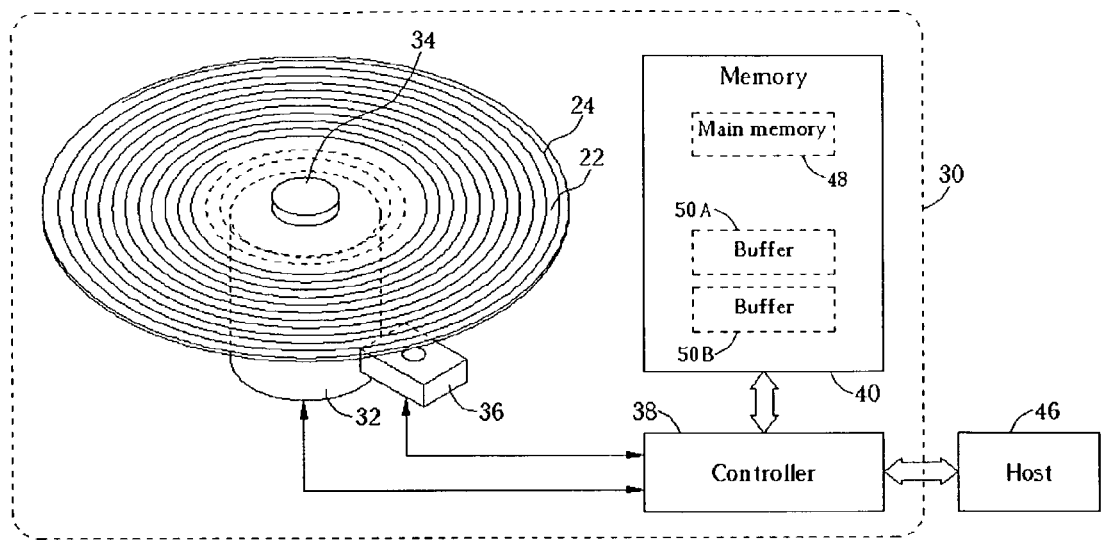
FIG. 6 is a block diagram of a present invention optical drive.

Please refer to FIG. 6. Illustrated in FIG. 6 is a block diagram of a present invention optical drive 30 for performing defects management. Like the drive 10 illustrated in FIG. 1, a user can access data on an optical disk 22 via a host 46 that controls the drive 30, which can be an optical drive of a personal computer. The drive 30 comprises a motor 32, a pickup head 36, a controller 38, and a memory 40 such as volatile random access memory for storing data during the operation of the controller 38. The motor 32 drives the optical disk 22 to rotate on a shaft 34 so that the controller 38 can access data on the track 24. The controller 38 can control the pickup head 36 to read the data wherein the pickup head 36 skips the track 24 of the optical disk 22 on the housing 34 or transfers the data stored temporarily in the memory 40 to the track 24. A main memory 48 and a plurality of buffers such as buffers 50A and 50B illustrated in FIG. 6 are provided in the present invention optical drive 30, wherein the main memory 48 is used to temporarily store data meant to be written to the optical disk 22, especially the data meant to be written to data blocks, and buffers are used to store temporarily the data meant to be transferred to data packets. More buffers can also be provided in the present invention.

Figure 7:
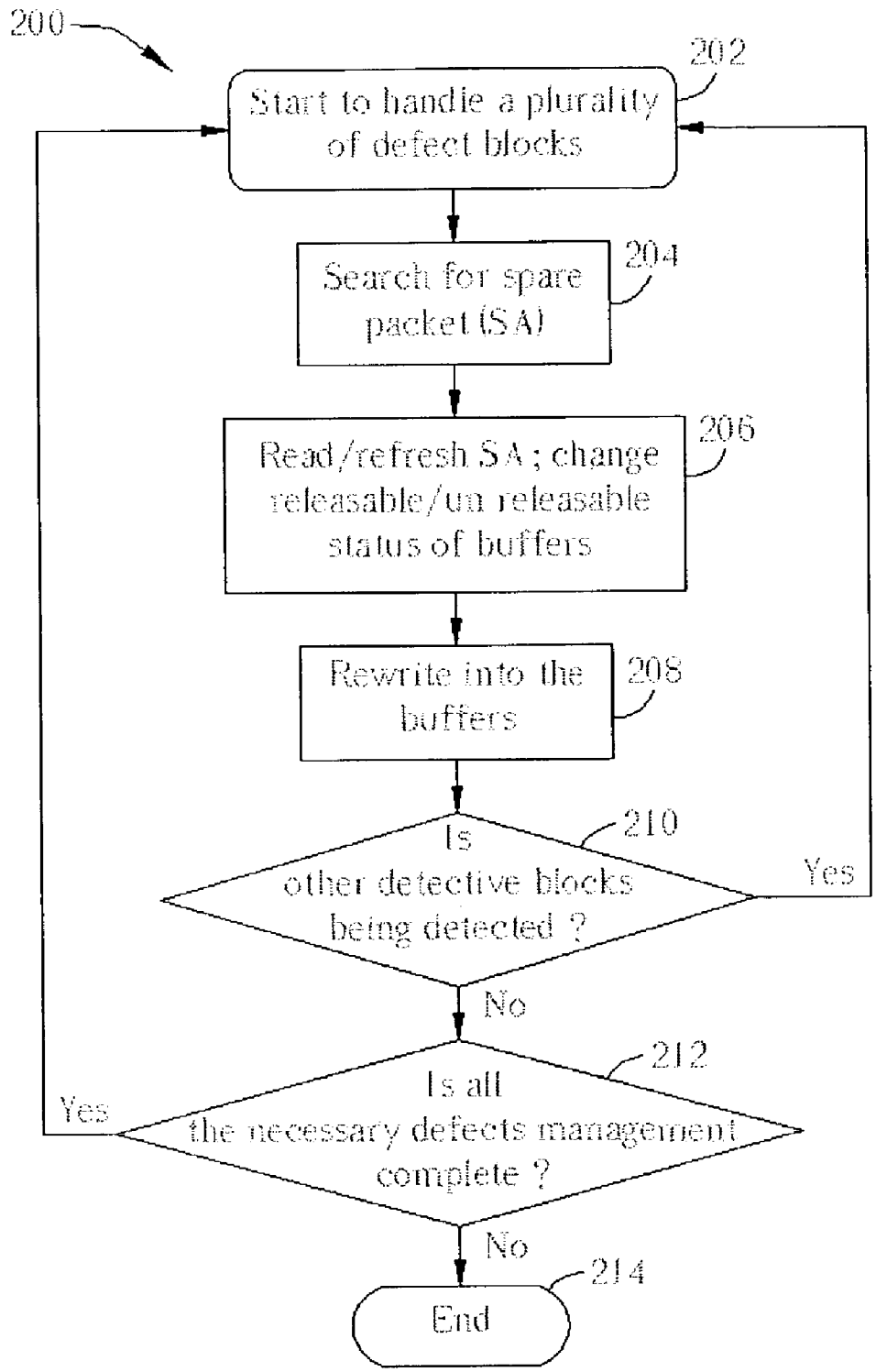
FIG. 7 is a flowchart according to an embodiment of the present invention.

Please refer to FIG. 7. FIG. 7 is a flowchart regarding the present invention flow 200. The flow 200 is as follows:

Step 202: Start to perform defects management. The present invention can perform defects management on a plurality of defective blocks such as defective data packets or defective spare packets at a time.

Step 204: Search for spare packets. A plurality of spare blocks of the spare area packet SA are applied to replace the defective blocks. For instance, if there are 5 unregistered defective blocks have to be deal with, a spare area packet SA having 5 available spare blocks is searched in step 204 to replace the defective blocks. In other words, the 5 "available" spare blocks in the spare area packet SA have not been used to replace other defective blocks.

Step 206: In step 204, if the spare area packet SA is transferred to any buffer in the memory 40, the spare area packet SA has to be transferred to a releasable buffer. Through the flow 200, each buffer in the memory 40 will be written with different data, and data in each buffer will become releasable or unreleasable through the whole defects management processes; wherein data in a "releasable" buffer can be rewritten, but data in an "unreleasable" buffer cannot be rewritten until the status of such buffer is switched to releasable. Because data in releasable buffers can be rewritten, in step 204, data in the spare area packet SA can be transferred into releasable buffers in the memory 40. Once the spare area packet SA is written into a buffer, the data meant to be written into the defective blocks will be copied to this buffer to update the spare area packet SA and perform defects management. The buffer then becomes an unreleasable one. In contrary, in step 202, the data meant to be written into the defective blocks will be released. If the data is originally stored in another unreleasable buffer, that buffer can be switched to a releasable one.

Step 208: Rewrite the spare packet in the unreleasable buffer into the optical disk 22.

Step 210: If other defective spare blocks are detected in step 208, return to step 204 to deal with these detected defect spare blocks.

Step 212: Return to step 202 and restart the flow 200 in order to deal with the following defective blocks. If all the required defects management is complete, go to step 214.

Step 214: End.

Figure 8A:
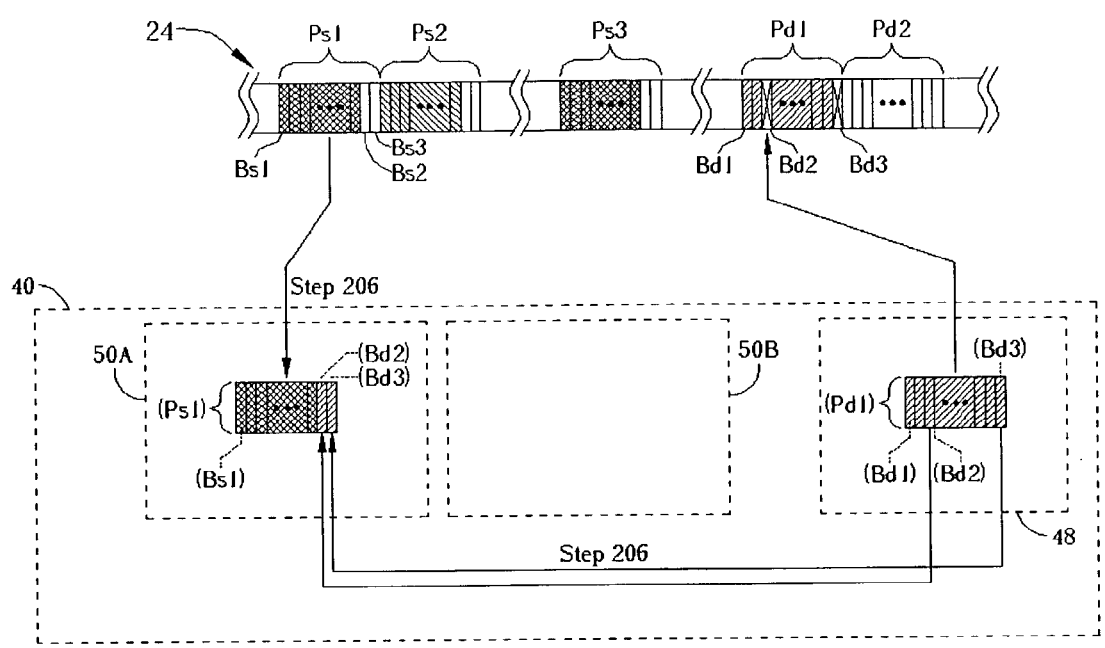
FIG. 8A to FIG. 8E are schematic diagrams of related data allocated in the optical drive in the duration of the flowchart illustrated in FIG. 6.
Figure 8B:
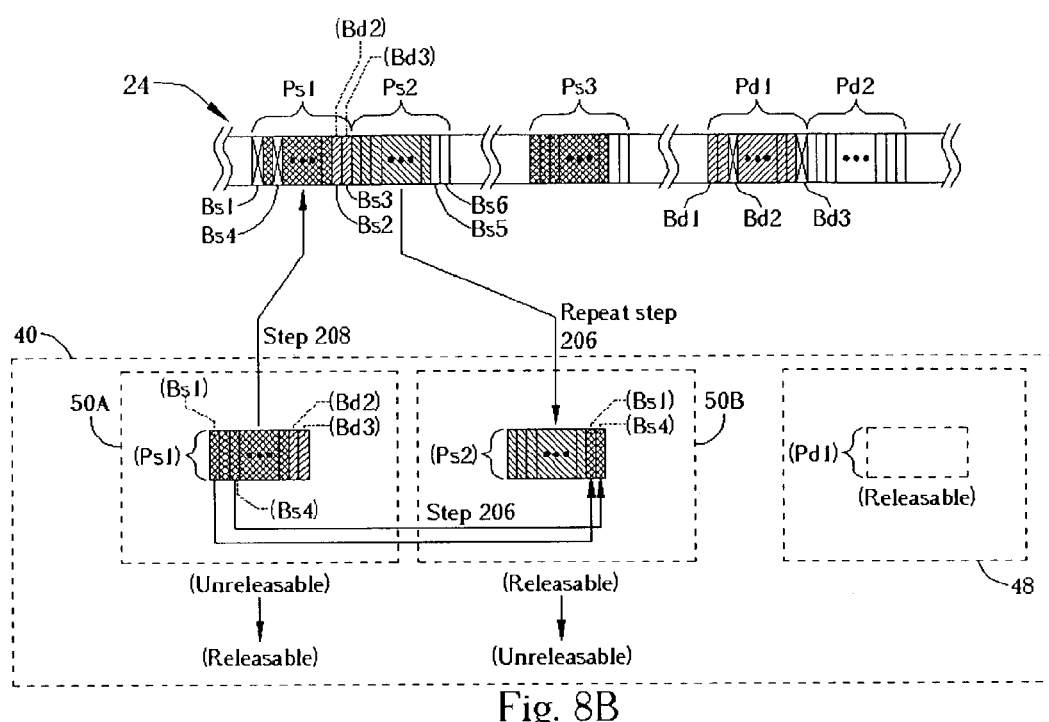

To further describe the processes in the flow 200 illustrated in FIG. 7, please refer to FIG. 8A to FIG. 8E. Illustrated in FIG. 8A to FIG. 8E are schematic diagrams of related data allocated on the track 24 of the optical drive 22 and in the memory 40 during the flow 200. Similar to the schematic diagram illustrated in FIG. 5A, when the drive 30 writes the data stored temporarily in the main memory 48 into the data packet Pd1 on the track 24 and the data blocks Bd2 and Bd3 are detected as defective blocks, step 202 of the flow 200 will be initiated. If in step 204 defective data blocks Bd2 and Bd3 are replaced with two unused spare data blocks Bs2 and Bs3 in the spare packet Ps1, in step 206 the spare packet Ps1 can be written into the buffer 50A and the data meant to be written into the data blocks Bd2 and Bd3 in the main memory 40 will be copied into the spare packet Ps1 in the buffer 50A. Then data in the buffer 50A is refreshed such that the buffer 50A becomes an unreleasable buffer. The buffer 50B without data stored is a releasable buffer. Due to that the data in the main memory 48 meant to be written into the data blocks Bd2 and Bd3 is copied into the buffer 50A, the data in the memory 48 meant to be written into the defective blocks Bd2 and Bd3 will be released. As illustrated in FIG. 8B, in step 208, the spare packet Ps1 in the buffer 50A can be rewritten onto the spare packet Ps1 on the track 24 to record the data blocks Bd2 and Bd3 onto the replacing spare data blocks Bs2 and Bs3 wherein the defect table DT will be refreshed correspondingly.

Figure 5A:
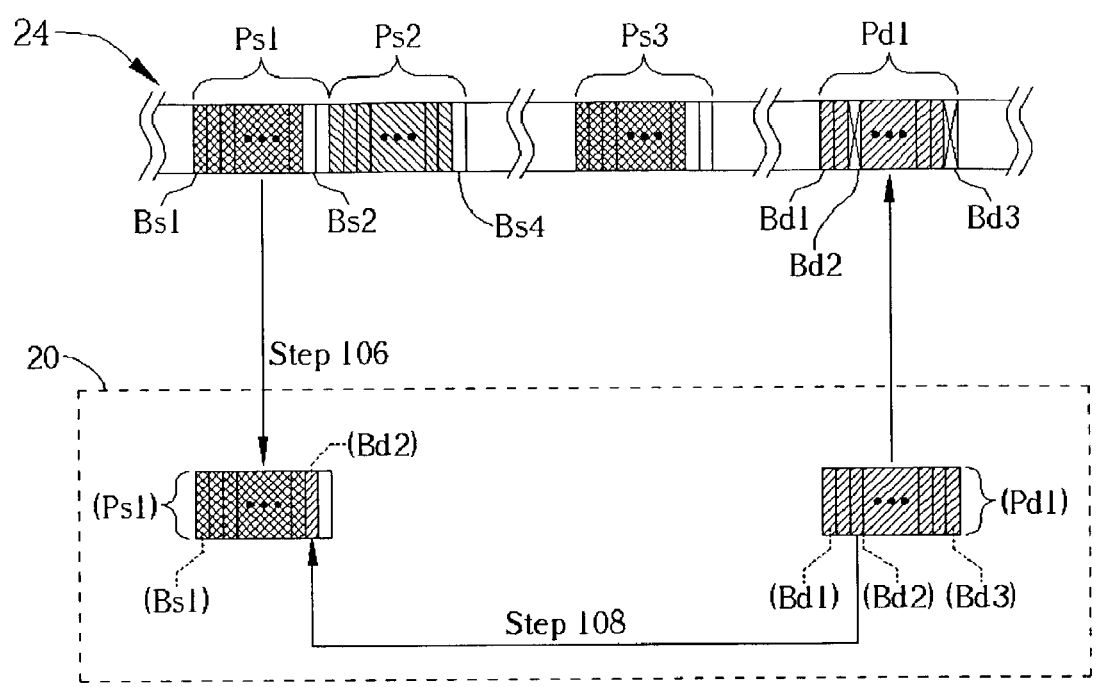
Figure 5B:
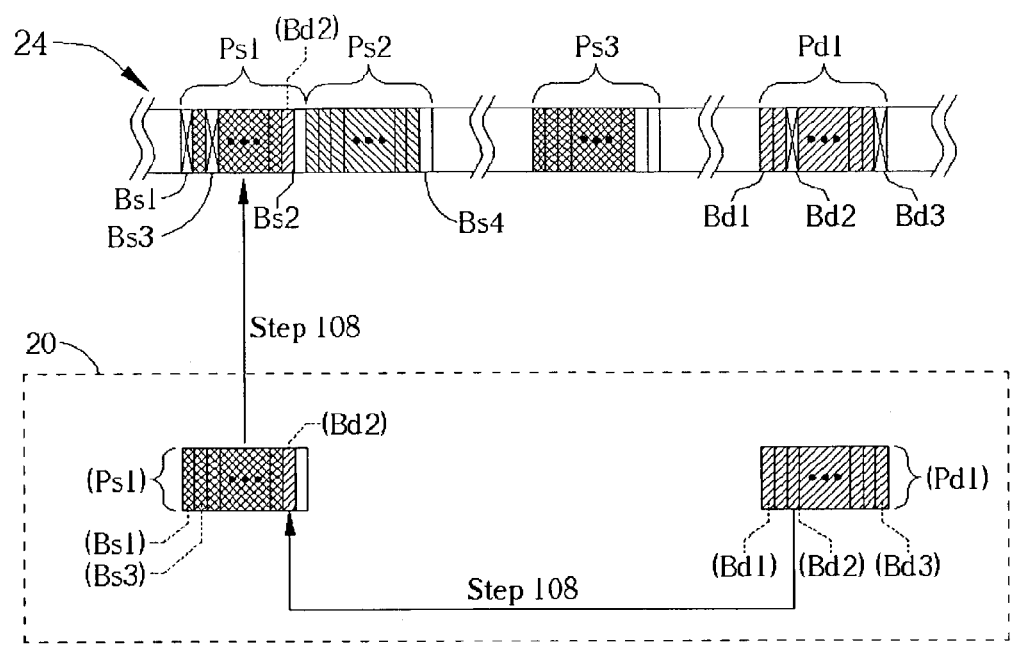
Figure 5C:
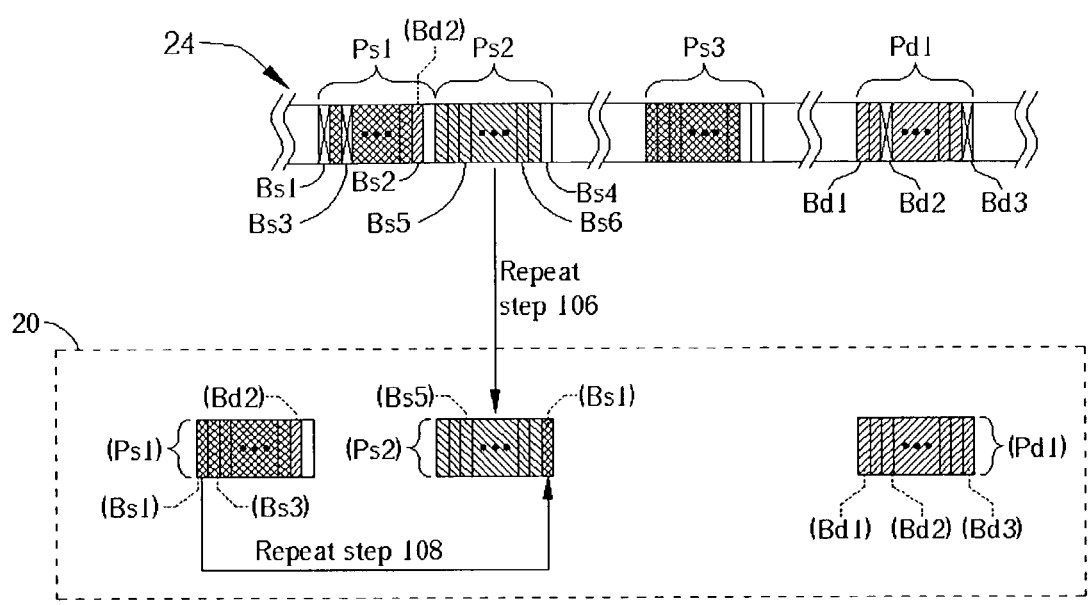
Figure 5D:
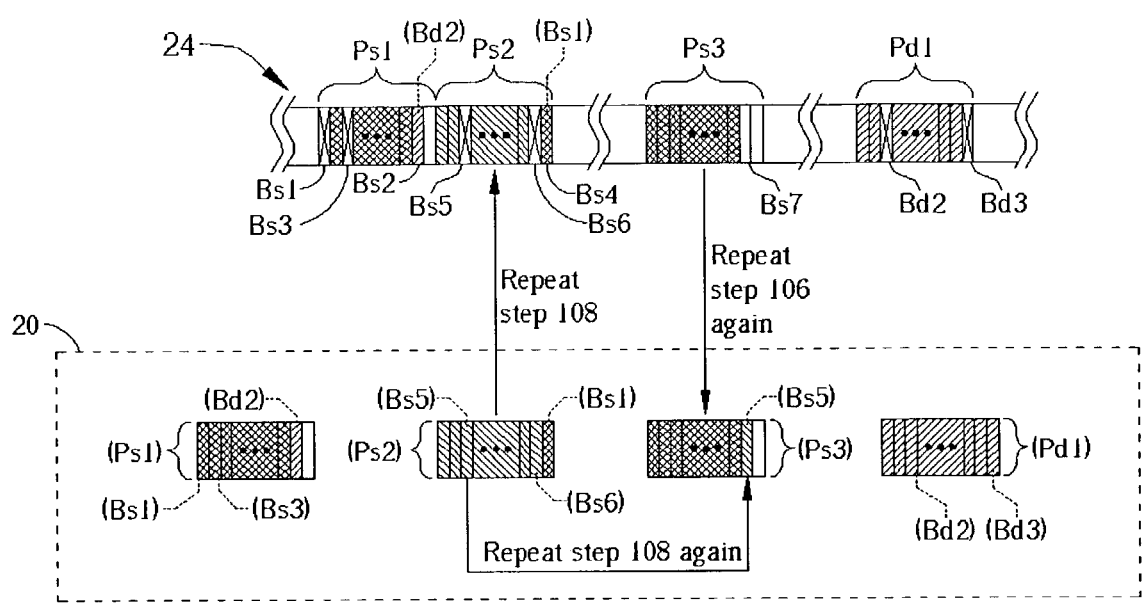
Figure 5E:
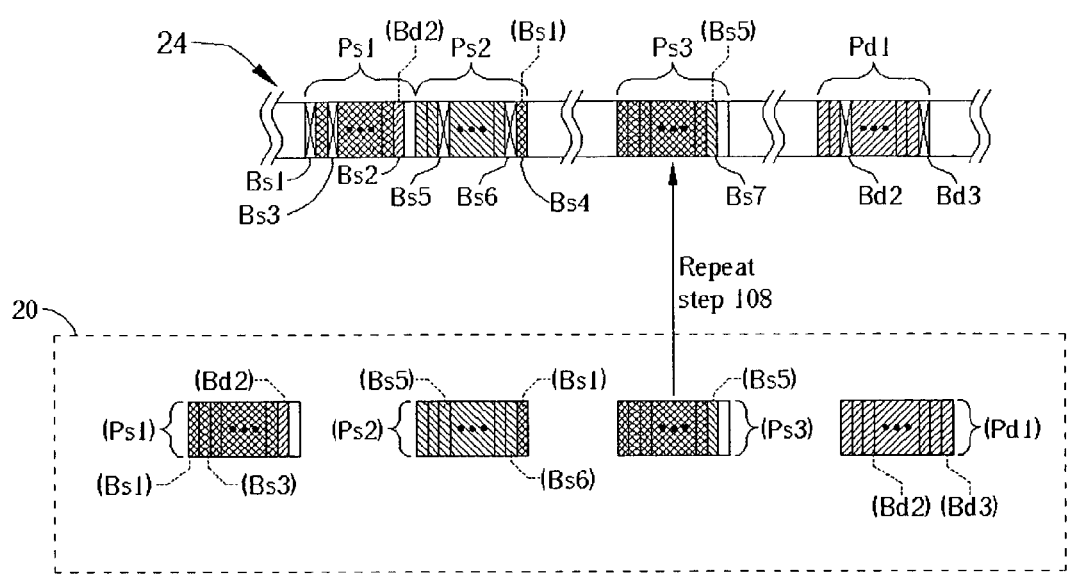

Similar to the schematic diagram in FIG. 5A, two other defective spare data blocks Bs1 and Bs4 are detected in the spare packet Ps1 during the rewriting process in step 208. The flow 200 can return to step 204. If in step 204 the spare data blocks Bs5 and Bs6 in the spare packet Ps2 are determined to replace the defective spare data blocks Bs1 and Bs4, the spare packet Ps2 can be written into the buffer 50B in step 206, and the data stored in the defective spare data blocks Bs1 and Bs4 will be copied into the spare packet Ps2 in the buffer 50B. After step 206, since all the data about defects management stored in the buffer 50A is copied to the buffer 50B, the spare packet Ps1 in the buffer 50A can be released to be rewritten. On the contrary, after step 206, since the spare packet Ps2 in the buffer 50B is refreshed such that the spare packet Ps2 contains data not being recorded in the optical disk, the buffer 50B then becomes an unreleasable one. In other words, after step 206, the releasable/unreleasable status between the buffer 50A and 50B has been switched.

Figure 8C:
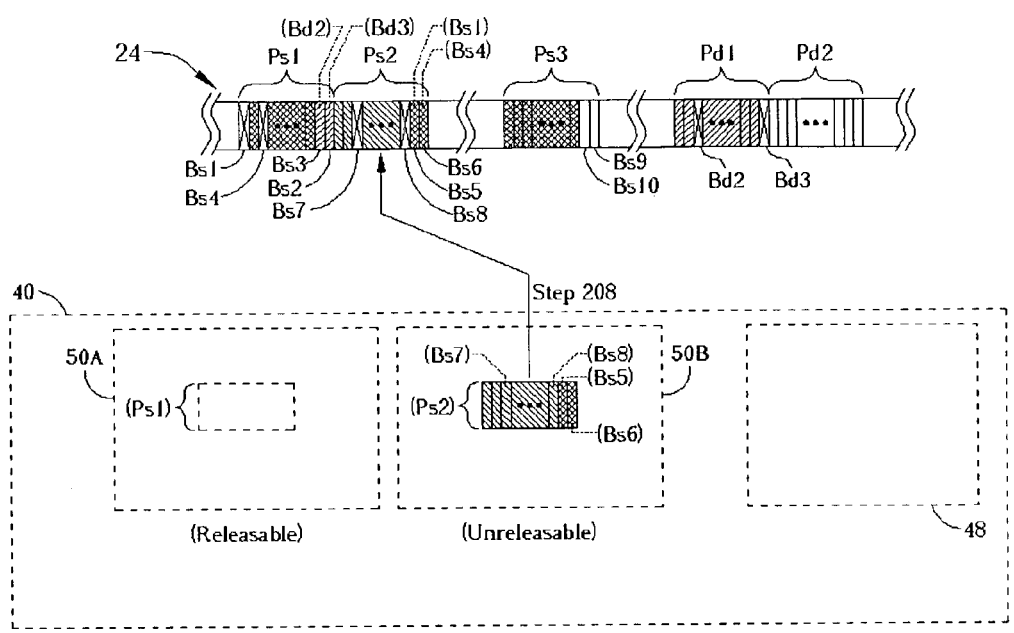
Figure 8D:
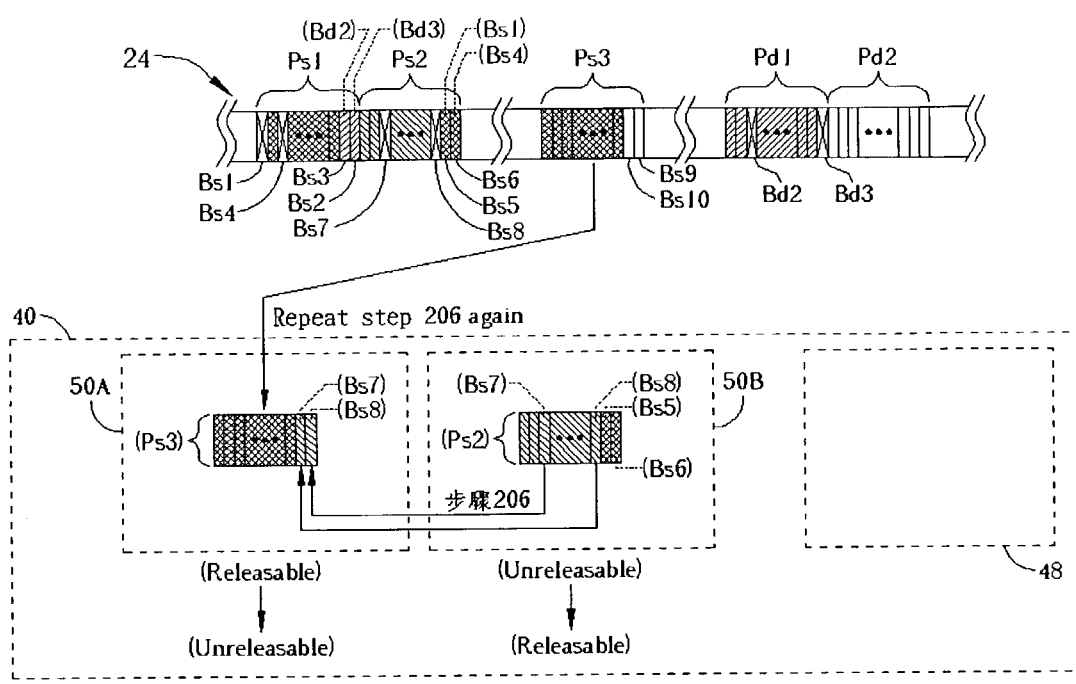
Figure 8E:
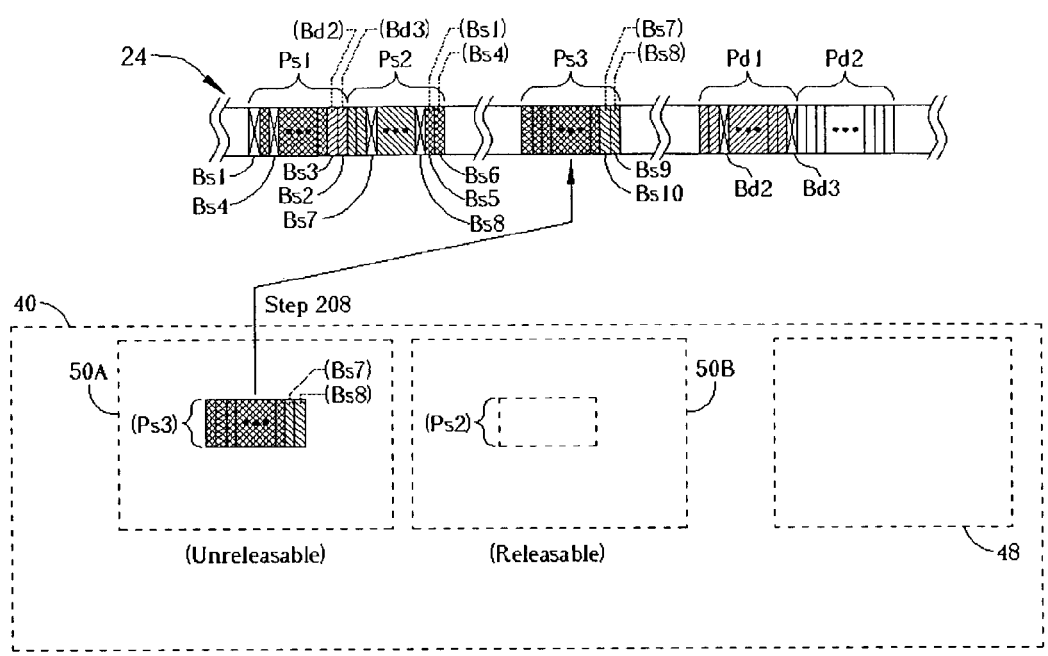

As illustrated in FIG. 8C, the flow 200 will go on to step 208 wherein the spare packet Ps2 in the buffer 50B will be rewritten onto the track 24. Data in the defective spare data blocks Bs1 and Bs4 will be recorded into the spare data blocks Bs5 and Bs6. When performing the rewriting procedure in step 208, if the spare data blocks Bs7 and Bs8 in the spare packet ps2 are detected as defective, the flow 200 will go to step 204 from step 210 and at least two unused spare block Bs9 and Bs10 will be chosen in the spare packet Ps3 for performing defects management on the spare data blocks Bs7 and Bs8. As illustrated in FIG. 8D, in step 206, in the flow 200 the spare packet Ps3 will be written into the releasable buffer 50A, and make the buffer 50A unreleasable. Data in the spare data blocks Bs7 and Bs8 will be copied into the buffer 50A according to spare space Ps2 stored temporarily in buffer 50B, and make buffer 50B releasable again. As illustrated in FIG. 8E, in the following step 208, the spare packet Ps3 in buffer 50A could be rewritten onto the track 24. If no other defect spare blocks are detected, go to step 212 and deal with the follow-up defect blocks, which are mainly data blocks. Even other defect spare blocks are detected when data rewritten into spare packet Ps3 in step 208, flow 200 could go back to step 206 and writes the required spare packet for defect management into the releasable buffer 50B and switch the releasable/unreleasable status between buffer 50A and 50B. In other words, in the present invention there will be at least one releasable buffer to be loaded with the spare packets required for defect management, which makes it possible to deal with the unceasing appearance of defect spare blocks.

To sum up, comparing the prior art flow 100 illustrated in FIG. 5A to FIG. 5E with the present invention flow 200 illustrated in FIG. 5A to FIG. 8E, we conclude that in the prior art flow 100, it will cost memory resource to unceasingly increase the allocated memory space for temporary storage of accumulated spare packets with the unceasing appearance of defective spare blocks. On the contrary, in the present invention flow 200, it takes only 2 buffers, whose volume can be the same as a spare packet, and switches the releasable/unreleasable statuses between these two buffers, to satisfy the memory resource demand for defects management, even with the unceasing appearance of defective spare blocks. This is because in step 204, a plurality of defective blocks can be dealt with at the same time. In step 206, buffers used to store temporary data of the defective blocks can be released to release the memory resource. For example, in FIG. 8B, when rewritten into the spare packet Ps1, all data of the defective spare blocks Bs1 and Bs4 will be copied from the buffer 50A to the buffer 50B so as to release the buffer 50A. In the same way, in FIG. 8C, when rewritten into the spare packet Ps2, all data of the defective spare blocks Bs7 and Bs8 will be copied from buffer 50B into the buffer 50A so as to release the buffer 50B. On the contrary, the prior art flow 100 being only capable of dealing with one defective block at once wherein the occupied memory space for temporary storage of other defective blocks cannot be released will result in accumulation of required memory space and waste of memory resources.

Figure 9:
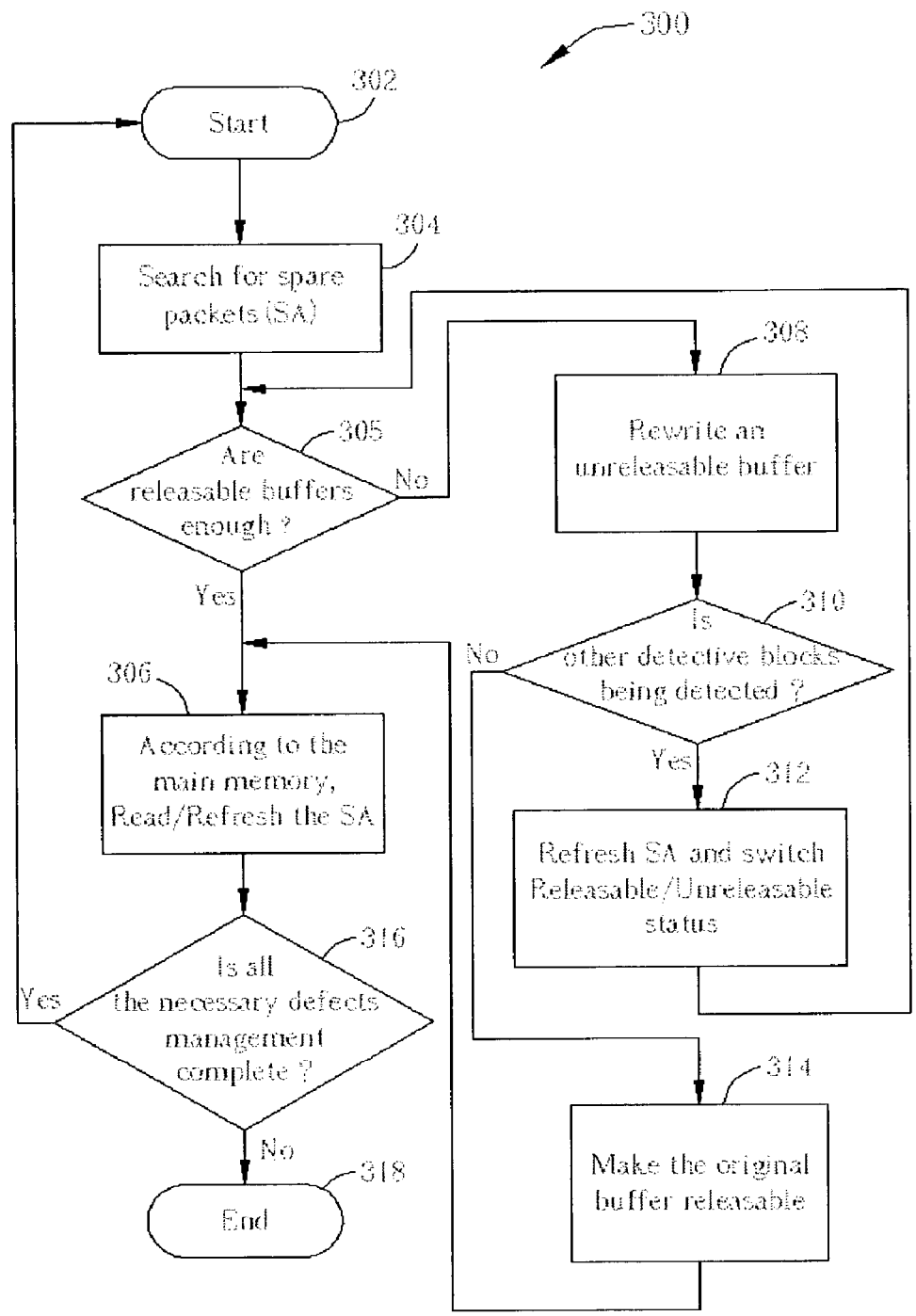
FIG. 9 is a flowchart according to another embodiment of the present invention.

Although it takes 2 buffers, for example, to perform the present invention flow 200 illustrated from FIG. 8A to FIG. 8E, more buffers can be provided in practice. Buffers in the present invention can be used as a cache to reduce the number of times of spare packets being read/rewritten to make data access on an optical disk and defects management more efficient. Please refer to FIG. 9. FIG. 9 is another embodiment of the present invention flow 300. In the flow 300, the spare packets being written into buffers are not rewritten temporarily, so they can be applied as caches. Combined with statuses switching between releasable/unreleasable applied in the flow 200, the flow 300 can fulfill the memory resource demands for appearance of continuous defective spare block with efficacy. The flow 300 is as follows:

Step 302: Start.

Step 304: Search for spare blocks for the defective. Similar to the flow 200, a plurality of defective blocks are handled in the flow 300. If there are a plurality of unregistered defective blocks being dealt with in step 302, spare packets having the same number of unused spare blocks have to be found in this step.

Step 305: Determine whether the releasable buffers in the memory 40 is enough; if so, go to step 208, if not, go to step 210. Some releasable buffers can be left for defects management in the flow 300. Thus before this step, determine whether or not the number of releasable buffers is enough. If spare packets found in step 304 are stored temporarily in an unreleasable buffer, one releasable buffer has to be applied in order to perform following processes. If the spare packets found in step 304 have been kept temporarily in a releasable buffer or such spare packets have not been written into any buffer in the memory 40, two releasable buffers have to be used in order to perform following processes. If the spare packet in step 304 has been kept temporarily in a releasable buffer, the releasable buffer should be refreshed to become an unreleasable one in order to perform defects management. Similarly, if the spare packets in step 204 have not been written into any buffer, after spare packets being written into a releasable buffer, such buffer will become an unreleasable one. Thus, another releasable buffer has to be applied to support the following procedures. According to how the spare packets are being written in step 304, it can be determined whether or not releasable buffers in the memory 40 are enough, and step 306 or step 308 is selectively performed.

Step 306: From step 305 to this step, it implies that in step 304 the spare packets have been kept in a buffer or have been written into a buffer from the track 24. In this step, the data meant to be written into the defect blocks in step 304 will be copied into the spare packets of the buffer to renew that spare packets. The buffer for recording the spare packets will become an unreleasable one.

Step 308: From step 305 to this step, it implies that the number of releasable buffers is not enough and at least one unreleasable buffer shall be rewritten onto the optical disk to release more releasable buffers. One unreleasable buffer can be chosen in this step such that the spare packets in the chosen unreleasable buffer can be written onto the track of the optical disk.

Step 310: If other defective spare blocks are recognized during the rewriting procedure in step 308; go to step 312; if not, go to step 314.

Step 312: Defects management will be applied on the detected defective spare blocks in step 308. If new spare packets should be loaded, the new spare packets will be loaded into the releasable buffer (there will be one at least at this moment), and the data about defects management in unreleasable buffers will be copied to the releasable buffer having the new spare packets in step 308 so as to switch the releasable/unreleasable status between these two buffers. If only the releasable/unreleasable statuses switching is applied in this step, it is possible that other releasable buffers cannot be released. In order to have enough releasable buffers, go back to step 305 to determine whether or not the number of releasable buffers is enough.

Step 314: If in step 314, the unreleasable buffer has been rewritten onto the optical disk without detecting other defective blocks, and the unreleasable buffer is switched to a releasable buffer. Thus the number of releasable buffers increases; go to step 316.

Step 316: Determine whether or not to continue dealing with the defective blocks, which are mainly defective data blocks. If continuing to deal with them, go back to step 302, if not, go to step 318.

Step 318: End. If there are unreleasable buffers in the memory 40, rewrite each one onto the optical disk. If other defective spare blocks are detected in this procedure, the flow 300 has to go back to step 302 to handle the detected defective spare blocks until each buffer is turned out to be releasable so as to end the flow 300.

Figure 3:
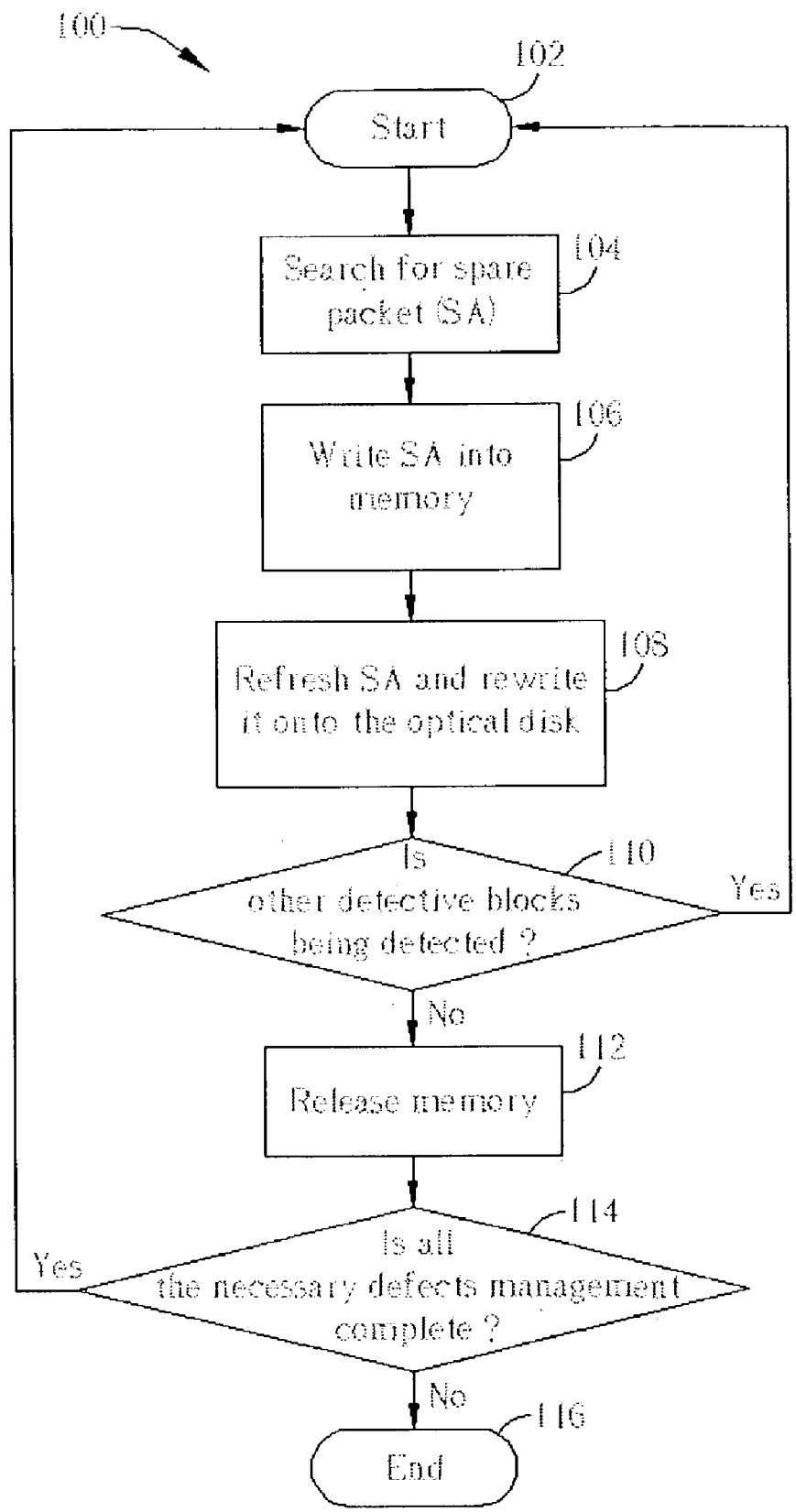
FIG. 3 is a flowchart of a prior art performing defects management.
Figure 10A:
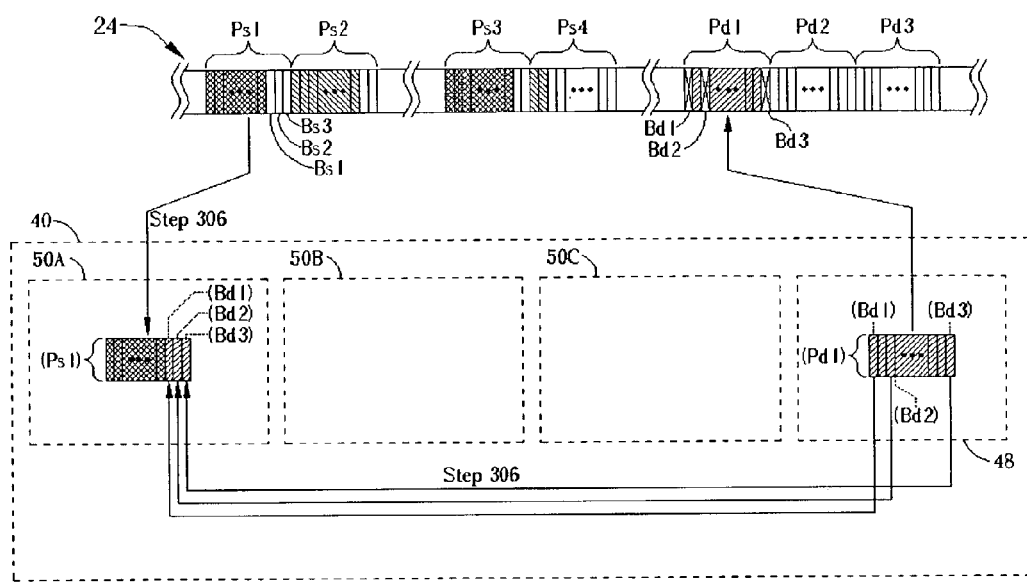
FIG. 10A to FIG. 10G are schematic diagrams of related data allocated in the optical drive in the duration of the flowchart illustrated in FIG. 9.

Please refer to FIG. 10A to FIG. 10G to further discuss the flow 300. FIG. 10A to FIG. 10G are the schematic diagrams of associated data allocation on the track 24 and the memory 40 in the flow 300 wherein the memory 40 is provided with 3 buffers, 50A, 50B and 50C. As illustrated in FIG. 10A, 3 unregistered defective data blocks Bd1 Bd2, and Bd3 are detected when the drive 30 writes data of the main memory 48 into the data packet Pd1. The flow 300 is thus initiated to manage defects. Like the flow 200, the flow 300 deals with the 3 defective data blocks at the same time. In step 304, 3 unused spare blocks Bs1 Bs2, and Bs3 in the spare packet Ps1 are determined to replace the detected defective data blocks. In the beginning, 3 buffers 50A, 50B and 50C are releasable buffers without any data being loaded. The flow 300 will go from step 305 to step 306 wherein the spare packet Ps1 will be written into the buffer 50A and data in the memory 48 meant to be copied into the data blocks Bd1 Bd2, and Bd3 will be copied into the buffer 50A to renew the spare packet Ps1 in the buffer 50A. The buffer 50A will thus become an unreleasable buffer, and the data in the memory 48 meant to be written into the data blocks Bd1 Bd2, and Bd3 can be released. The spare packet in the buffer 50A have not to be rewritten onto the optical disk temporarily.

Figure 10B:
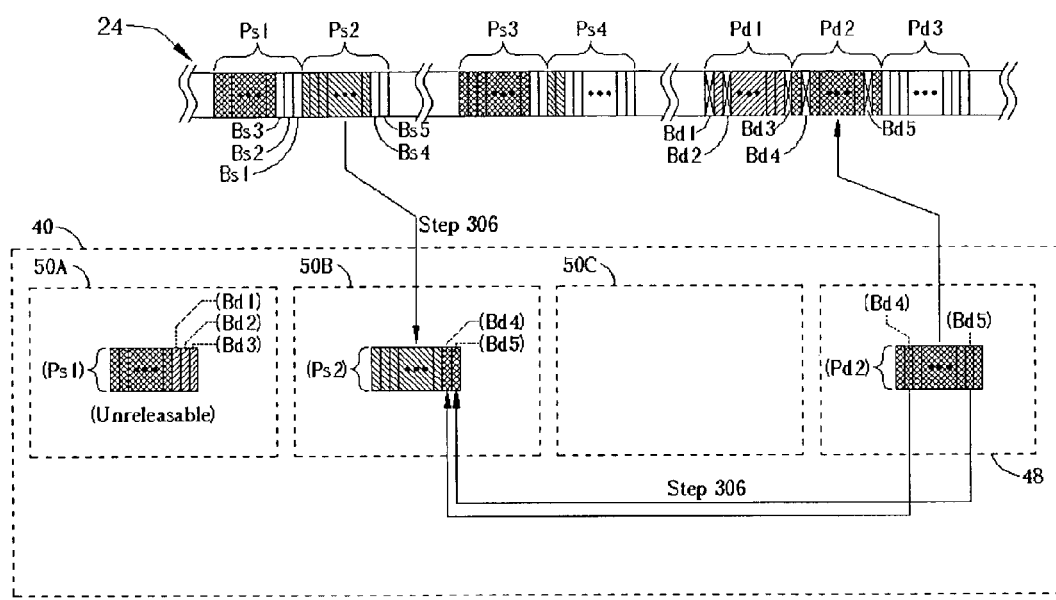
Figure 10C:
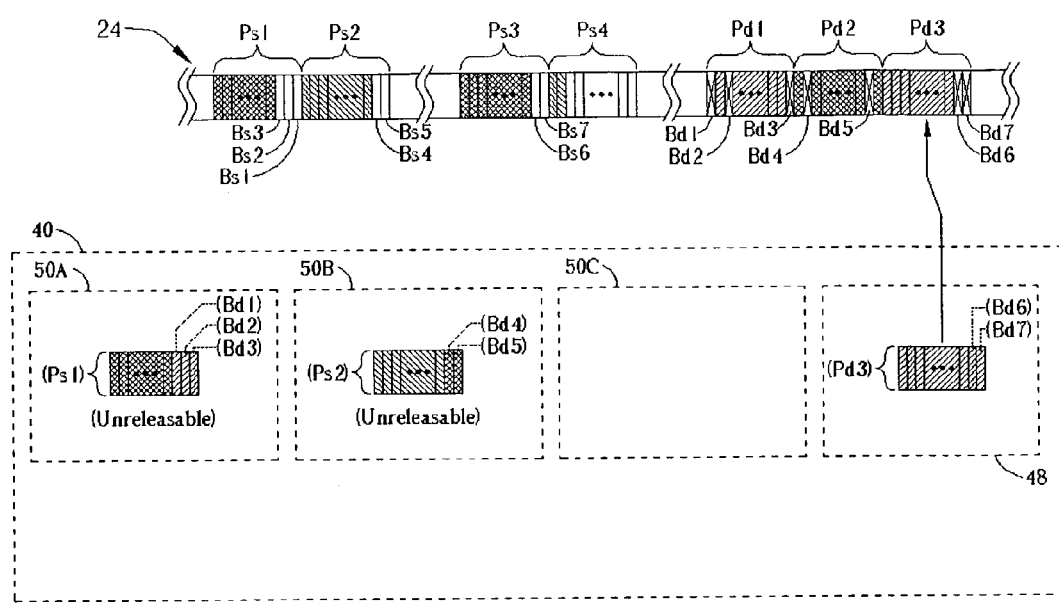
Figure 10D:
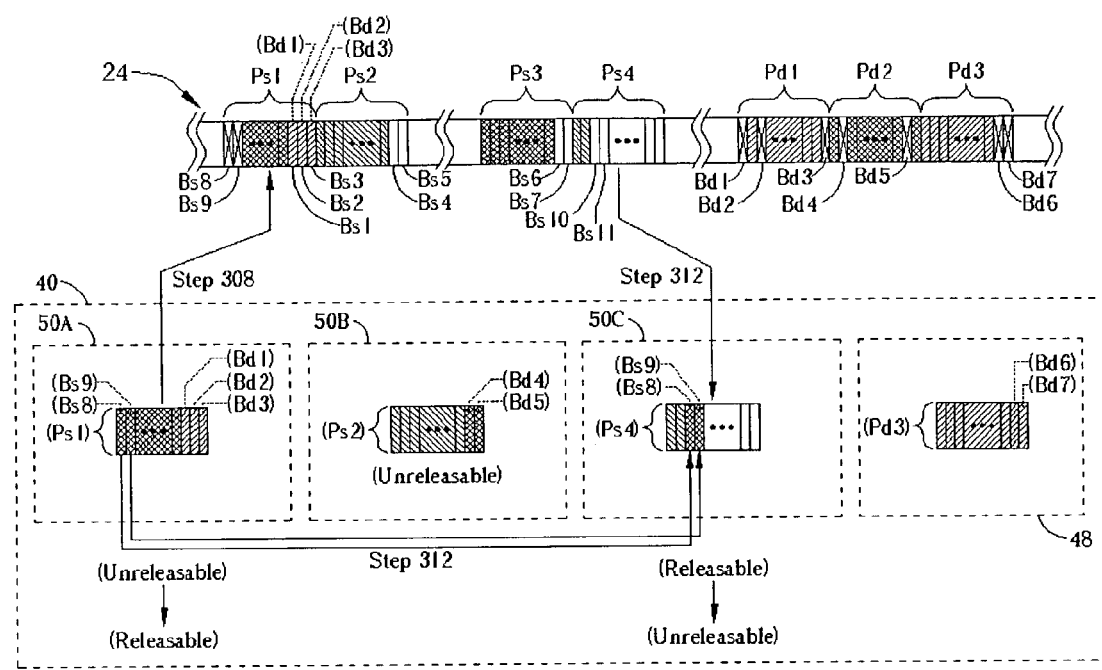

In FIG. 10B, two unregistered data blocks Bd4 and Bd5 are detected when the drive 10 continues to write data into the data packet Pd2. The flow 300 will go back to step 302 and 304 deciding to replace the defective data blocks Bd4 and BdS with two unused spare blocks in the spare packet Ps2. Right now, 2 of the 3 buffers in the memory 40 remain available and releasable. Thus, in step 305 and 306, the drive 10 can transfer the spare packet Ps2 into the buffer 50B, and copy the data meant to be written into the defective data blocks Bd4 and BdS into the buffer 50B to renew the spare packet Ps2. At this moment, the buffer 50B will become unreleasable and the data in the main memory 48 meant to be written into the defective data blocks Bd4 and Bd5 can be released. In FIG. 10C, if two other defective data blocks Bd6 and Bd7 are detected when the drive 10 transfers the data stored temporarily in the main memory 48 into the data packet Pd3, the flow 300 will go to step 302 from step 316 to perform defects management on these two data blocks. In step 304, the spare data blocks Bs6 and Bs7 in the spare packet Ps3 are supposed to replace the defective data blocks Bd6 and Bd7, but the spare packet Ps3 has not been stored temporarily in any buffer wherein the buffer 50A and 50B are already unreleasable. If the spare packet Ps3 is written into the buffer to refresh it, the 3 buffers will all become unreleasable. In order to keep at least one buffer for following operation, the flow 300 will go to step 305 from step 300 to choose one unreleasable buffer and rewrite it onto the track 24. As illustrated in FIG. 10D, the spare packet Ps1 in the buffer 50A is supposed to be written onto the spare packet Ps1 on the track 24. However, during the rewriting procedure, there are two detected unregistered defective spare data blocks Bs8 and Bs9 in the spare packet Ps1, the flow 300 will go to step 312 from step 310 to replace the 2 defective spare data blocks Bs8 and Bs9 with the spare data blocks Bs10 and Bs11 in the spare packet Ps4. In step 312, the spare packet Ps4 will be written into the releasable buffer 50C, and the data in the buffer 50A meant to be written into the defective spare data blocks Bs8 and Bs9 will be copied into the spare packet Ps4 in the buffer 50C. Thus, the buffer 50A and 50C will be switched from unreleasable/releasable to releasable/unreleasable. In other words, the statuses of the buffer 50A and 50C are exchanged after step 312. However, there is still only one releasable buffer, the buffer 50A among these 3 buffers. Therefore, the flow 300 will go back to step 308, and rewrite one unreleasable buffer onto the track 24.

Figure 10E:
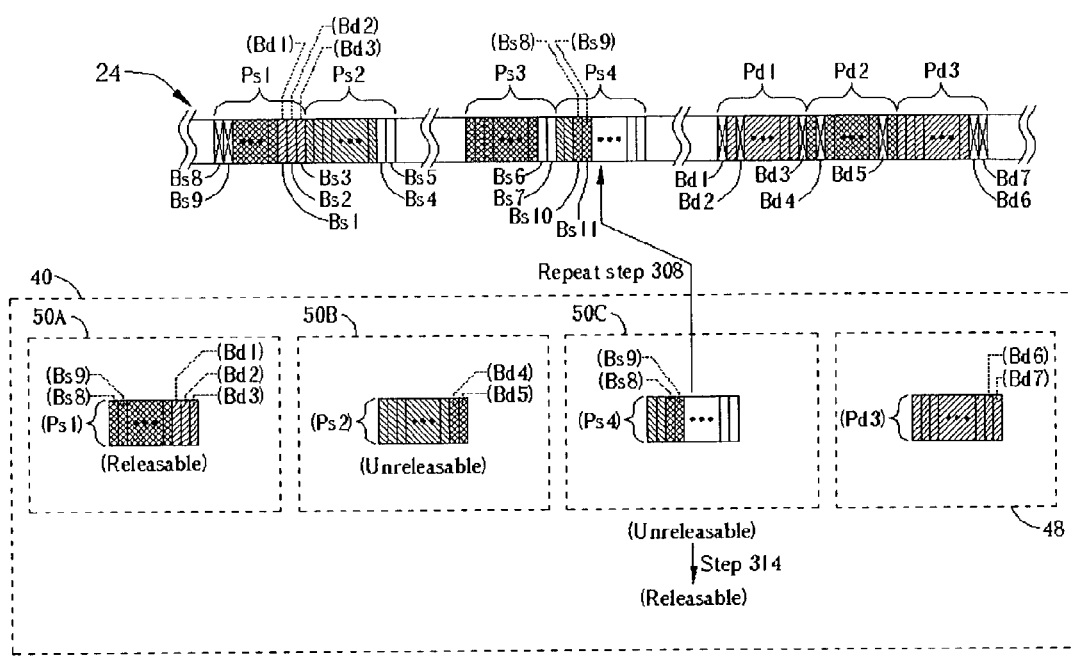

As illustrated in FIG. 10E, if in step 308 the spare packet Ps4 in the buffer 50C is determined to be rewritten, with no other defective spare blocks being detected, the flow 300 can go to step 314 from step 310 to make the buffer 50C releasable. Thus, 2 of the 3 buffers 50A and 50C will become releasable and the flow 300 can go to step 306 to perform defects management on the data blocks Bd6 and Bd7. Please notice that even if other defective blocks have been detected during the rewriting procedure of the spare packet Ps4 in the buffer 50C, the spare packets required for defects management can be written into a releasable buffer to satisfy demands of continuous defects management. The situation is similar to that illustrated in FIG. 8B to FIG. 8E. In other words, even if defective spare blocks have been detected continuously during spare packets being rewritten in the flow 300, the memory resource demands for defects management can be satisfied with a constant number of buffers, which is similar to the flow 200. Besides, in FIG. 10B, the buffer 50B can be determined to be rewritten in step 308.

Figure 10F:
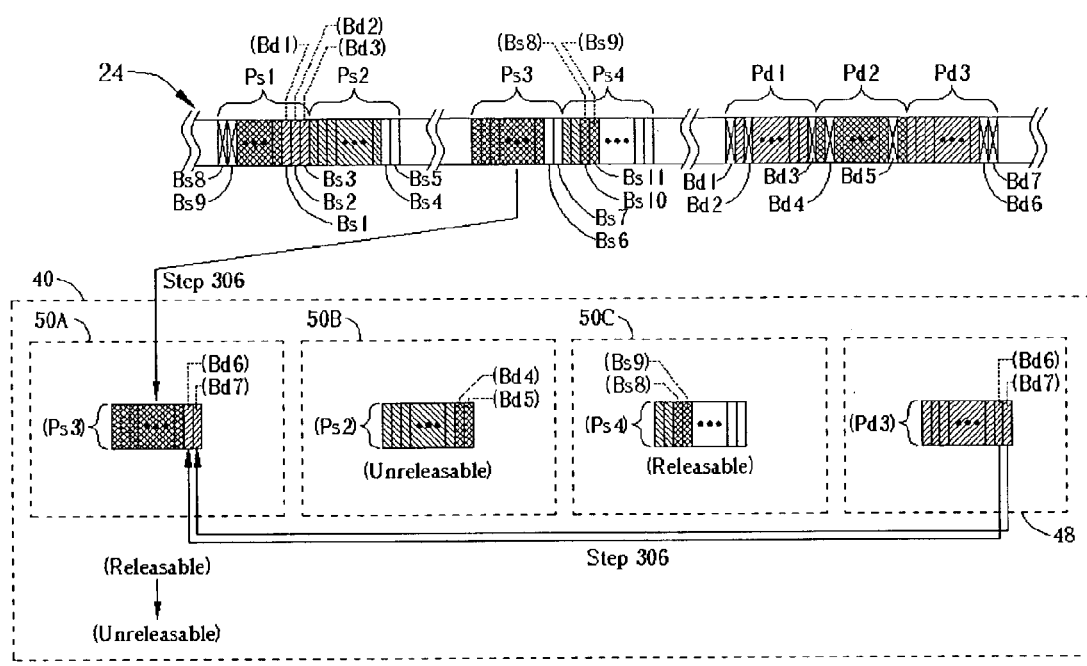

To sum up, after step 308, 310 and 312, in step 314 the flow 300 can follow the step 304 to handle the defective data blocks Bd6 and Bd7. As mentioned above, in order to deal with the 2 defective data blocks, the spare packet Ps3 should be written, and empty one releasable buffer in step 314 so that the memory 40 will have 2 releasable buffers 50A and 50C. As illustrated in FIG. 10F, in step 306, the spare packet Ps3 is determined to be transferred into the buffer 50A, and the data in the main memory 48 meant to be written into the defective data blocks Bd6 and Bd7 can be copied into the buffer 50A to refresh the spare packet Ps3 in the buffer 50A, and the data meant to be written into the defective data blocks Bd6 and Bd7 stored in the main memory 48 will be released. On the contrary, the buffer 50A will become unreleasable after renewal.

Figure 4A:
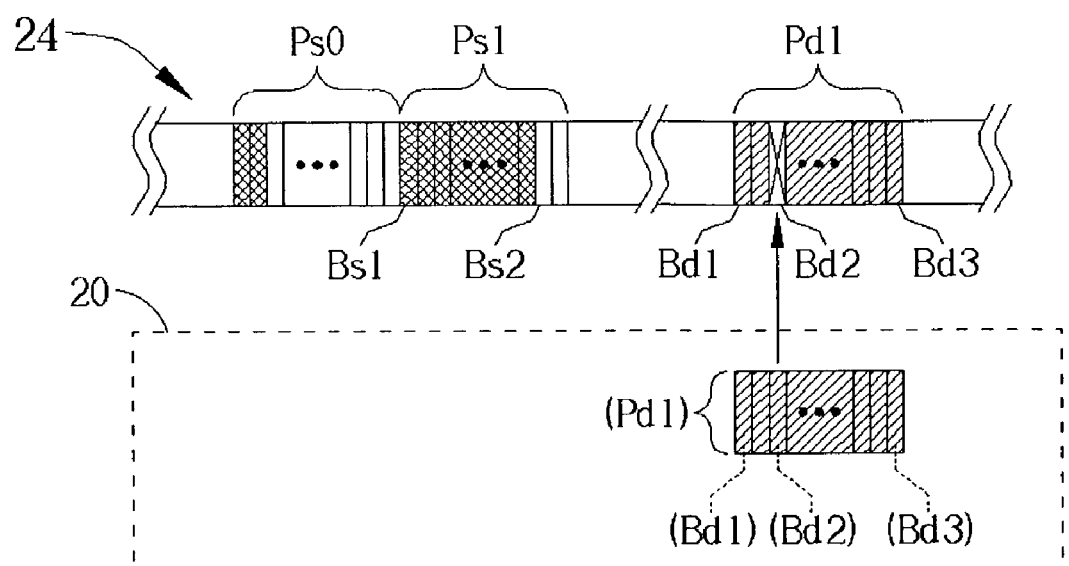
FIG. 4A to FIG. 4C, and FIG. 5A to FIG. 5E are schematic diagrams of related data status during defects management of an optical drive illustrated in FIG. 3.
Figure 4B:
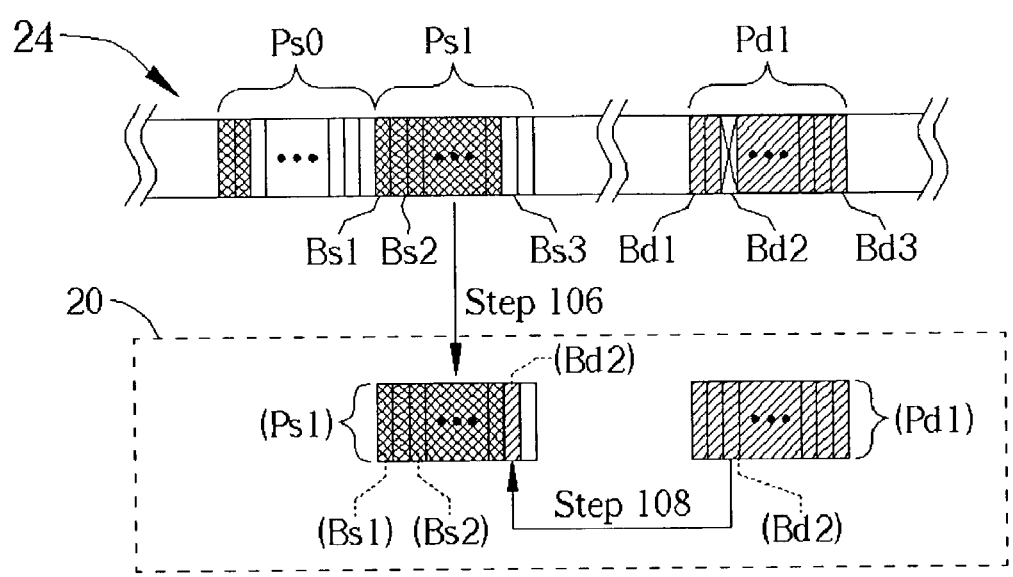
Figure 4C:
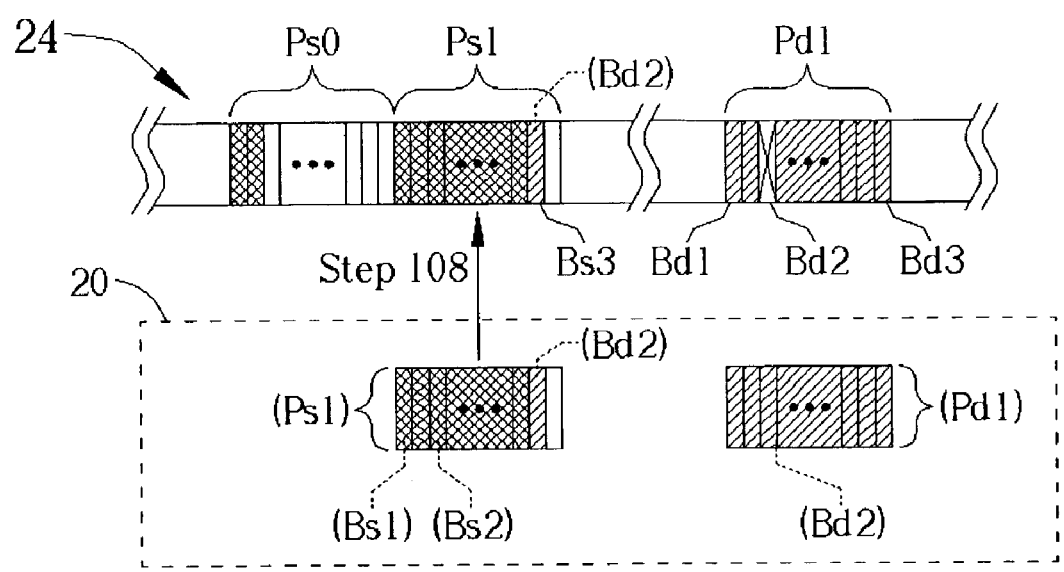
Figure 10G:
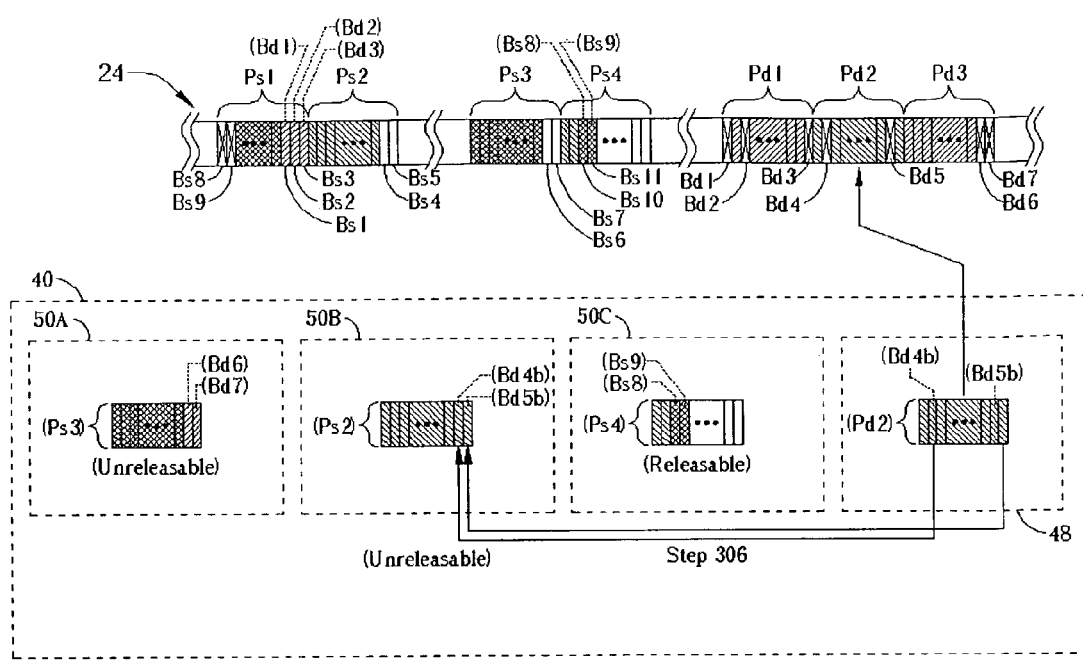

In the present invention, spare packets in buffers, releasable or not, can be used as a cache to reduce the times of performing reading/writing of spare packets during defects management. For example, the host 46 will write data into the same data packet repeatedly while some application programs are under operation. As illustrated in FIG. 10G, the host 46 will rewrite data into the data packet Pd2 again. In FIG. 10G, the data packet Pd2 having 2 registered defect blocks Bd4 and Bd5 has been detected and determined to be replaced by the spare data blocks Bs4 and Bs5 in the data packet Pd2. In FIG. 10G, in step 304, when data is rewritten into the data blocks Bd4 and Bd5 again, the spare packet Ps2 will be applied in related defects management. In step 305, since the buffer 50B is an unreleasable buffer and the spare packet Ps2 in it has not been rewritten, the flow 300 can go to step 306 directly to copy the new data Bd4*b* and Bd5*b* in the main memory 48 meant to be written into the defective data blocks Bd4 and Bd5 into the buffer 50B. The data Bd4*b* and Bd5*b* in the main memory 48 can be released then. For the buffer 50B is an unreleasable buffer, refreshing the buffer 50B will not reduce the number of releasable buffers, and it need not go to step 308. Please notice that the left spare packet Ps2 in the buffer 50B acts like a cache, which can be used in related defects management of the spare packet Ps2 without repeatedly writing into the spare packet Ps2. If the spare packet Ps2 in the memory 40 has been released and rewritten after being rewritten onto the optical disk, the pickup head will be applied to read the spare packet Ps2 again to perform defects management. The refreshed spare packet Ps2 will be written onto the optical disk, like the situation of the prior art illustrated in FIG. 4A to FIG. 4C. On the contrary, the present invention takes the spare packet in an unreleasable buffer as a cache so as to reduce requirement of reading/writing procedure for defects management on one defective block. The present invention can not only satisfy the memory resource demands for defects management with a fixed number and volume of each buffer, but also reduce the number of times of data accessing to an optical disk with the spare packet left in each buffer, which acts as a cache, to increase the efficiency of data accessing of a drive and prolong the life span of optical disks.

In FIG. 10G, in addition to that the spare packets in an unreleasable buffer can be used as caches, the spare packet Ps4 in the releasable buffer 50G can be used as a cache, too. For example, during the following data writing procedure, the flow 300 can choose spare packets in the spare packet Ps4 to perform defects management in step 304. However, if copying the data in the main memory 48 meant to be written into the defective data blocks to the buffer 50C directly, the refreshed buffer 50C will become an unreleasable buffer so as to reduce the number of releasable buffers. So, the flow 300 will go to step 308 from step 305 at the first place to rewrite an unreleasable buffer onto the optical disk to generate another releasable buffer in step 314. Then it will go to step 306 to copy the data in the main memory 48 meant to be written into the defective blocks, to the spare packet Ps4 in the buffer 50C, then the buffer 50C will become an unreleasable buffer and the spare packet Ps4 can function as a cache as well.

In the flow 300, each spare packet left in each buffer can function as a cache. At the end of the flow 300 such as all the data in the host 46 is completely written onto the optical disk or the user wants to eject the optical disk from drive 30, data in each unreleasable buffer has to be rewritten onto the optical disk. During rewriting processes from step 308, 312, to 314, each unreleasable buffer will be switched to releasable, which means that all related data in the flow 300 has been written onto the optical disk and the flow 300 is complete. For example, in FIG. 10G, after data in the main memory 48 is written into the data packet Pd2, the host 46 will not request the drive 30 to write data in, and the flow 300 will start to rewrite unreleasable buffers onto the optical disk. If the flow 300 writes the spare packet Ps3 into the buffer 50A at first, even if other defective spare blocks are detected during rewriting and other spare packets have to be read in for defects management, the required spare packets can be written into the buffer 50C. In step 314, since the number of releasable buffers increases to two and only one unreleasable buffer will be rewritten, the memory resource is certainly no short of supply.

From the above discussion, the flow 300 of the present invention can make use of two or more than two buffers freely to support memory resource demand with one releasable buffer among buffers and reduce the need for reading/writing by accessing caches by the spare packets stores in each buffer. In fact, at the beginning of the flow 300 without demands for defects management, spare packets can be written into each buffer to act as caches in the first place. In this situation, each buffer can be set up as releasable at this moment. Even if no required spare packets are written into any buffer at the beginning of step 304, the flow 300 can go to step 305 directly from 306. Besides, in addition to the examples discussed above, wherein each buffer is assumed to be applied to record one spare packet, the present invention can allocate a larger space volume to store more spare packets. In step 304, a plurality of defective data blocks can be handled at the same time in the present invention, the number of blocks being handled at a time can be set up in another way. For example, the main memory can receive data from the host 46 unceasingly and write the data to the data blocks on the optical disk wherein the data meant to be written into the defective blocks will accumulate in the main memory 48. After a certain predetermined volume of data of the defective blocks accumulated in the main memory 48 is achieved, step 304 will be performed for defects managements on these defective data blocks. Or, the data in the main memory 48 being written correctly onto the optical disk can be released at first wherein data regarding defective data blocks remain in the main memory 48, the main memory 48 can receive data from the host 46 unceasingly. Until there is no more volume to store data from the host 46, go to step 304 to perform defects management on the defective data blocks in the main memory 48.

During the unreleasable buffers rewriting in step 308, the chosen buffer for rewriting can be determined according to different methods. For example, if there is one spare packet having less available spare blocks in an unreleasable buffer, rewrite it first. Or, if there is one unreleasable buffer having spare packets, which have not been refreshed for a given time, it implies that the value of this unreleasable buffer to act as a cache decreases, and it can be rewritten first. Additionally, when one unreleasable buffer A is being rewritten in step 310 and 312 wherein unregistered defective spare blocks have been detected and the memory 40 further contains an unreleasable buffer B whose spare packets still having enough unused spare blocks, the spare packets of the buffer B can be applied to perform defects management on the buffer A. After refreshing the spare packets in the buffer B according to the data in buffer A, which is meant to be written into the defect spare blocks, the buffer B still remains unreleasable and the buffer A will become releasable to increase the number of releasable buffers. The flow 300 can go to step 305 directly from step 306.

The prior art can only deal with one defective block at a time. If there are several defective blocks, the spare packets of the memory in the drive used to manage defects cannot be released at the same time, and this results in continuously wasting memory resources of the drive and decreases the operation efficiency of the drive. The present invention can handle the defects management of a plurality of defective blocks at the same time with a fixed number of buffers. With only one releasable buffer in each buffer, the memory resource demand for unceasingly detecting defective blocks can be met. Data stored in each buffer can act as a cache to reduce the number of times for reading/writing of an optical disk by the drive, prolong the lifetime of the optical disk, and increase the data accessing efficiency of the drive.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of accessing data on an optical disk with an optical drive, the Optical drive comprising a memory having a plurality of buffers for recording data; the optical disk having a plurality of data area packets (DA packets) and a plurality of spare area packets (SA packets), each DA packet having a plurality of data blocks for recording user data, each SA packet having a plurality of spare blocks for replacing corresponding defect data blocks or defect spare blocks to record data; the method comprising:

when writing data recorded in a first buffer to a first SA packet, if the first SA packet has a plurality of defective first spare blocks, searching for an SA packet as a second SA packet having a plurality of second spare blocks for replacing the plurality of defective first blocks;

if the second SA packet and the first SA packet are different packets, reading data of the second SA packet to a second buffer, and recording data of the first buffer for preparing to write the defective first spare blocks to the second spare blocks;

when writing data of the second buffer to the second SA packet, if the SA packet has at least one defective second spare block, searching for an SA packet as a third SA packet having a third spare block for replacing the defective second spare block; and if the third SA packet and the second SA packet are different packets, reading data of the third SA packet and overwriting data of the first buffer, so that the first buffer no longer records data written to the first block.

2. The method of claim 1 wherein the buffer records data written in each spare block, and the buffer does not record data written in the data blocks.

3. The method of claim 1 wherein each buffer has the same capacity of memory.

4. The method of claim 1 wherein each buffer is capable of recording data of an SA packet.

5. A method of accessing data on an optical disk with an Optical drive, the optical drive comprising a memory having a plurality of buffers for recording data; the optical disk having a plurality of data area packets (DA packets) and a plurality of spare area packets (SA packets), each DA packet having a plurality of data blocks for recording user data, each SA packet having a plurality of spare blocks for replacing corresponding defect data blocks or defect spare blocks to record data; the method comprising:

when writing data recorded in a first buffer to a first SA packet, if the first SA packet has a plurality of defect first spare blocks, searching for an SA packet as a second SA packet having a plurality of second spare blocks for replacing the plurality of defective first blocks;

if any of the spare blocks of the second SA packet are not read to the memory, reading data of the second SA packet to a second buffer, and recording data of the first buffer written to the defect first spare block to the second buffer;

after writing data recorded in a third buffer to a third SA packet, if the third SA packet has at least one defective third spare block, searching for an SA packet as a fourth SA packet having a fourth spare block for replacing the defective third spare block; and if any of the spare blocks of the fourth SA packet are not read to the memory, and data of the first buffer has been written to the first SA packet, reading data of the fourth SA packet and overwriting data of the first buffer, so that the first buffer no longer records data written to the first spare block.

6. The method of claim 5 wherein the third buffer is the second buffer, and the third SA packet is the second SA packet.

7. The method of claim 5 wherein the third buffer and the second buffer are different buffers, and the second SA packet and the third SA packet are different SA packets.

8. The method of claim 5 further comprising after recording data of the first buffer writing the defect first spare block to the second buffer, if data of the first buffer has been updated, before writing data of the first buffer to the first spare block, not reading data of the fourth SA packet and overwriting data of the first buffer.

9. The method of claim 8 further comprising: if data of the first buffer has been updated, writing data of the first buffer to the first spare block.

10. The method of claim 5 wherein the buffers are for recording data written to each spare block, but not for recording data written to each data blocks.

11. The method of claim 5 wherein each buffer has the same capacity of memory.

12. The method of claim 5 wherein each buffer is capable of recording data of an SA packet.

* * * * *